United States Patent
Rehg et al.

[11] Patent Number: 5,930,379
[45] Date of Patent: Jul. 27, 1999

[54] METHOD FOR DETECTING HUMAN BODY MOTION IN FRAMES OF A VIDEO SEQUENCE

[75] Inventors: James M. Rehg, Arlington, Mass.; Henry A. Rowley, Pittsburgh, Pa.

[73] Assignee: Digital Equipment Corporation, Maynard, Mass.

[21] Appl. No.: 08/876,603

[22] Filed: Jun. 16, 1997

[51] Int. Cl.[6] .............................. G06K 9/00; G06T 15/70
[52] U.S. Cl. ........................... 382/107; 345/473; 348/155
[58] Field of Search ....................... 382/103, 107, 382/155–159, 236, 224–228, 181, 190, 276, 286; 348/153–155; 345/419–420, 427–432, 328, 424, 473–474

[56] References Cited

U.S. PATENT DOCUMENTS

| | | | |
|---|---|---|---|
| 5,034,986 | 7/1991 | Karmann et al. | 382/103 |
| 5,173,945 | 12/1992 | Pieters et al. | 382/107 |
| 5,365,603 | 11/1994 | Karmann | 382/103 |
| 5,623,428 | 4/1997 | Kunii et al. | 345/473 |
| 5,847,716 | 12/1998 | Hashimoto | 345/473 |

Primary Examiner—Jose L. Couso
Assistant Examiner—Bhavesh Mehta
Attorney, Agent, or Firm—Cesari and McKenna, LLP

[57] ABSTRACT

In a computerized method, a moving object is detected in a sequence of frames of a video of a scene. Each of the frames includes a plurality of pixels representing measured light intensity values at specific locations in the scene. The pixels are organized in a regularized pattern in a memory. The object is modeled as a branched kinematic chain composed of links connected at joints. The frames are iteratively segmented by assigning groups of pixels having like pixel motion to individual links, while estimating motion parameters for the groups of pixels assigned to the individual links until the segmented pixels and their motion parameters converge and can be identified with the moving object as modeled by the kinematic chain.

24 Claims, 4 Drawing Sheets

METHOD FOR DETECTING HUMAN BODY MOTION IN FRAMES OF A VIDEO SEQUENCE

BACKGROUND OF THE INVENTION

The present invention relates generally to video processing, and more particularly to detecting human body motion in a sequence of video frames.

FIELD OF THE INVENTION

Pixel motion is an important cue for detecting and recognizing objects and their actions in a sequence of video images, a "video." Because few objects in the world move quite the way that people do, motion analysis of videos can be used to detect people in videos.

The detection of people is one of the basic steps in advanced video processing applications such as content-based video indexing and retrieval, and nonlinear video editing. In the case of video indexing, the number of people present in a video sequence is a basic attribute that can be combined with other information about the video for retrieval purposes. If the pixels in digitized images that represent people can be identified, these pixels can be segmented out and separately manipulated in a video editing system. Reliable detection of people can also be useful in automated surveillance systems, and user-interface applications, such as smart kiosks.

The detection of people in a video sequence essentially resolves to the problem of segmentation, that is, identifying and marking those pixels in each frame of the video which correspond to a human body. In contrast to the more difficult problem of detecting people in a single image, the relative motion of pixels in a sequence of image frames, i.e., the "optical flow," can be an important cue for detecting people because very few objects in the world exactly move the way people do.

One of the most common video detection techniques, image differencing, exploits pixel motion by comparing two consecutive video frames, and marking changes in pixel intensity values above a predetermined threshold. Groups of adjacent pixels having like motion parameters can generally be assumed to correspond to moving objects in the observed scene.

However, image differencing is not well suited for detecting people because the observed pixel motion in a video can result from a wide variety of sources, such as camera motion, leaves blowing in the wind, cars going by, and the like. In order to perform reliable human body motion detection, the system must be able to discriminate moving people from other sources of image motion.

Some prior art systems detect specialized types of human motion. For example, one system addresses the special case where people are walking parallel to the image plane of the camera. In this scenario, the distinctive pendulum-like motion of the legs can be discerned by examining selected scanlines in the image over a multiple frames. Unfortunately, this approach does not generalize to arbitrary body motions, and other camera angles.

Another technique uses Fourier analysis to detect periodic body motion as seen in certain human activities, for example, walking or swimming. A small set of these activities can be recognized when the video sequence contains several periods of the distinctive body motion. However, many body motions, such as hand gestures, are non-periodic, and in practice, even periodic motions may not always be visible to identify the periodicy.

One system uses action recognition to identify a family of specific body motions such as sitting down, waving a hand, etc. This approach stores a set of models for the actions to be recognized, and filters an image sequence accordingly. A threshold on the output of the filtering determines whether a specific action has occurred, or not. The drawback of this technique is that it requires a stored model for each motion to be recognized. As a result, action recognition does not generalize well to the case of detecting arbitrary human body motions.

Recently, an expectation-maximization (EM) technique has been used to model pixel movement using simple affine flow models. There, the optical flow of images is segmented into one or more independent rigid body motion models. However, for the human body, movement of the various body parts tends to be highly dependent on each other. Treating the parts independently leads to a loss in accuracy.

The known techniques do not address the general problem of reliably discriminating all instances of human body movement from other sources of image motion because the known motion models are usually highly specialized for specific motions. Therefore, it is desired to provide a general method for detecting a full range of human body motions so that people in a video can reliably be detected.

SUMMARY OF THE INVENTION

The present invention provides a computerized method for detecting and identifying moving objects in a video of a scene. The video is a temporally ordered set of frames, each frame includes a plurality of pixels representing measured light intensity values at specific locations in the scene at a specific instance in time. The pixels can be stored in a memory of a computer system.

A model of the object is statically represented as a branched kinematic chain composed of links connected at joints. Each joint has predetermined degrees of freedom about which the links can be angularly displaced.

The frames are iteratively segmented by assigning groups of pixels having like motion parameters, these are called templates, to individual links. Concurrently while segmenting, motion parameters for the templates assigned to the individual links are estimated until the segmented pixels and their motion parameters converge and can be identified with the moving object as modeled by the kinematic chain.

The links of the branched kinematic chain model the torso, head, and limbs of a human body so that the moving objects can be identified as persons. Here, the torso is designated as a base link of the kinematic chain.

The motion parameters include the relative angular displacement of groups of pixels assigned to links connected by the same joint so that the position of any link can be described as a coordinate transformation relative to a base link. The position of the base in the scene can be described a rotation and translation with respect to the scene.

DETAILED DESCRIPTION OF THE PREFERRED EMBODIMENT

System Architecture

Figure 1:
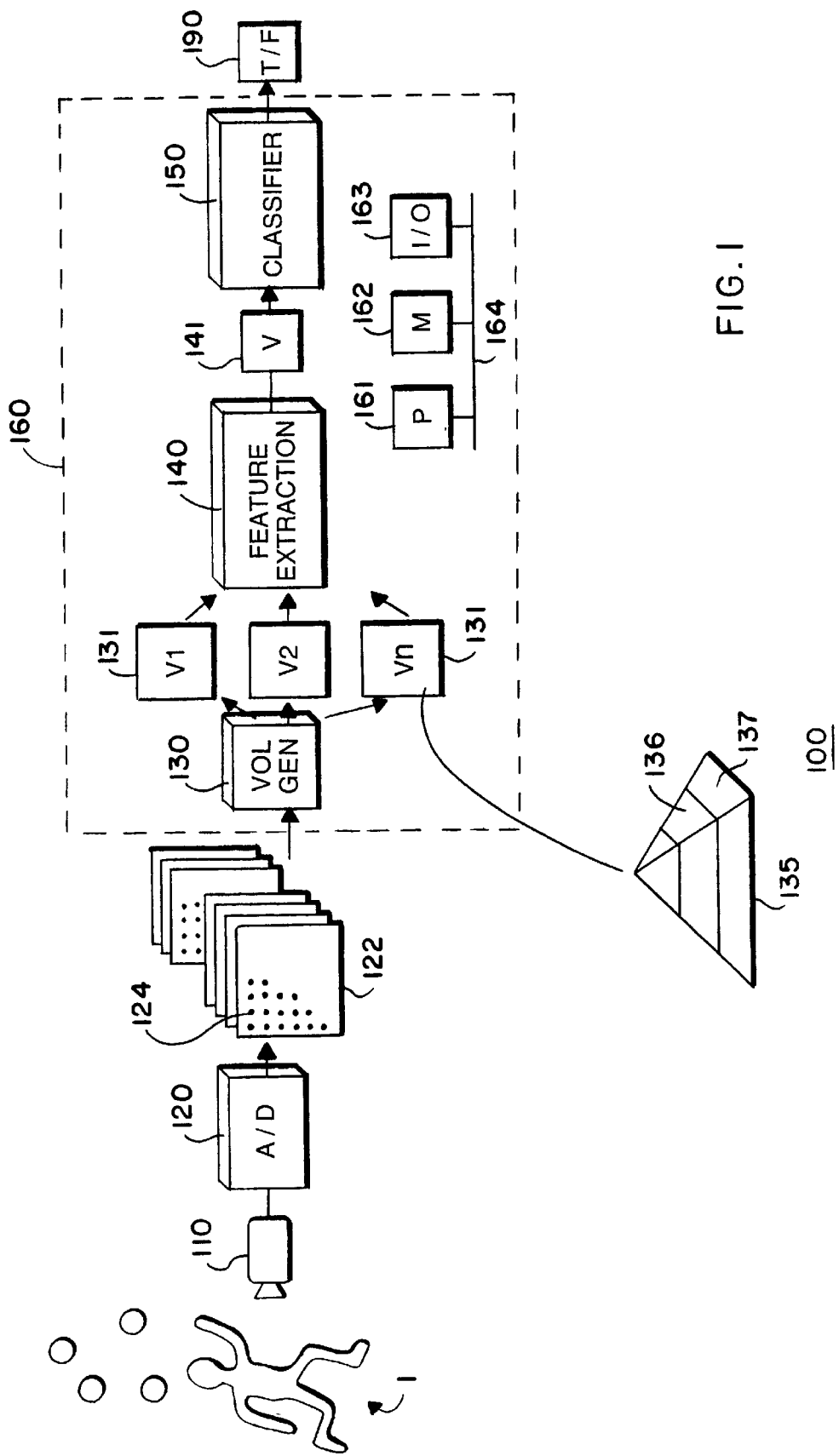
FIG. 1 is a block diagram of a human body motion detection system according to the invention.

FIG. 1 shows a system 100 which performs human body motion detection according to the preferred embodiment of the invention. The system 100 includes a camera 110 coupled optionally to an analog-to-digital converter (A/D) 120. The output of the A/D 120 is coupled to a volume generator 130, a feature extractor 140, and a classifier 150 of a video processing system 160.

The camera 110 can be conventional. If the camera 110 is a digital camera, then the A/D 120 is not required. The volume generator 130, feature extractor 140, and classifier 150 preferably are implemented as software programs of the computerized video processing system 160. The video processing system 160 can include a processor (P) 161, a memory (M) 162, and input/output interfaces (I/O) 163 connected to each other by a bus 164.

During operation of the system 100, the camera 110 observes a scene 1 including one or more moving persons and possibly many other moving objects. The observed scene 1 can be digitized by the A/D 120 to produce a video sequence of temporally ordered frames 122. For example, the frames 122 are produced at a rate of thirty per second. Of course, other rates are also possible.

Each frame 122 is organized as a regular array of pixels 124. Each pixel 124 represents light intensity values of specific portions of the observed scene 1. The pixels 124 can also include color values, although the invention can be worked only using gray-scale intensity values. Typically, the pixels 124 are stored as words of data in a tape, disk, or solid state memory while being manipulated.

The sequence of frames 122 are presented to the video processing system 160 via the I/O 163. The pixels 124 can be stored in the memory 162 at addresses which correspond to the locations of pixels 124 in the frames 122. Machine executable instruction of operating system and application software programs, also stored in the memory 162, execute in the processor 161 to manipulate the pixel data of the frames 122. For the purpose of the invention, the instructions implement the method steps of the volume generator 130, the feature extractor 140, and the classifier 150 described in greater detail below.

As an introduction, the key step in motion-based detection is to decide whether or not a particular portion of the video sequence includes pixels representing a specific moving object, for example, a person. Making this decision all at once for the entire video sequence is difficult because this would require considering all possible cases of multiple persons at multiple instances in time, e.g., different frames.

In the preferred method, the video sequence is partitioned into a series of "volumes" of frames, e.g., V1, V2, . . . Vn 131, by the volume generator 130. Each volume 131 is a set of temporally ordered frames 124 representing the scene 1 over a known interval of time. Each volume can represent, for example, several seconds of the video sequence.

This leads to the simpler problem of detecting whether a moving person is observed in a particular volume using the feature extractor 140. The classifier 150 can be applied to the video sequence in space and time to detect all instances of moving people wherever they may occur.

A preferred process performs an exhaustive search over a space-time pyramid 135. In the process, volumes 131 of a fixed size are extracted from a pyramid representation of the image sequence. In a pyramid, each higher image "layer" 136 in the pyramid is a coarser representation of the adjacent lower image layer 137. The lowest layer can be the entire video.

The first step constructs a spatial pyramid of images for the frames 124 of the video sequence by successive down sampling. A possible down sampling technique which can be used is described by Burt et al., in "The Laplacian pyramid as a compact image code," IEEE Transaction on Communications, 31, pp. 532–540, 1983. This spatial pyramid compensates for the unknown size of the people in the various frames.

The second step down samples the resulting spatial sequence in time. The temporal down-sizing helps compensate for the unknown duration of the motion. The layers of the resulting space-time pyramid 135 can rapidly be examined to whatever level of detail that is required in both space and time.

Given the series of volumes 131, a two stage process is proposed to solve the people detection problem in each volume. First, a particular volume is processed and mapped into vectors (V) 141 of a predetermined feature space by the feature extractor 140. Second, the classifier 150 determines whether the feature vectors 141 represent moving people.

This reduces to a classical pattern detection problem. A large number of classifier choices are possible during the third stage of the process. A representative classifier uses a feed-forward neural network with a single hidden layer. The network maps the input feature vectors to single valued output 190. The network is trained to produce a logical one (true) if human motion is detected, and a logical zero (false) for other types of motion. A predetermined threshold on the output of the network determines whether or not a particular feature vector should be classified as human motion.

The preferred embodiment of the invention uses a feature space based on articulated or kinematic models of human motion, and a process for mapping a volume of frames into this feature space. The kinematic models describes the basic constraints, due to the human skeleton, that control how human body parts are likely to move.

By using kinematic constraints, it is possible to describe the full range of human body motion which is not limited to special cases as described above. At the same time, the kinematics represent a powerful constraint which non-human motion is unlikely to satisfy. As an advantage, the present method yields feature vectors that have greater discriminating power. The feature vectors are a result of fitting the kinematic motion models to the volumes 131 of video images.

Articulated Motion Model

In the preferred embodiment, the human body is modeled as an articulated object which is composed of rigid links connected at joints. Each joint has predetermined degrees of freedom about which the link can move. The kinematic model can be used to determine if the motion of pixels in frames of the image sequence correspond to human body motion. When the appearance of the link is modeled by a texture mapping plane, a simple motion model can be derived which expresses pixel motion in terms of angles at the joints connecting the links. The corresponding segmentation model assigns pixels to the links in the kinematic chain where their motion originates.

Figure 2:
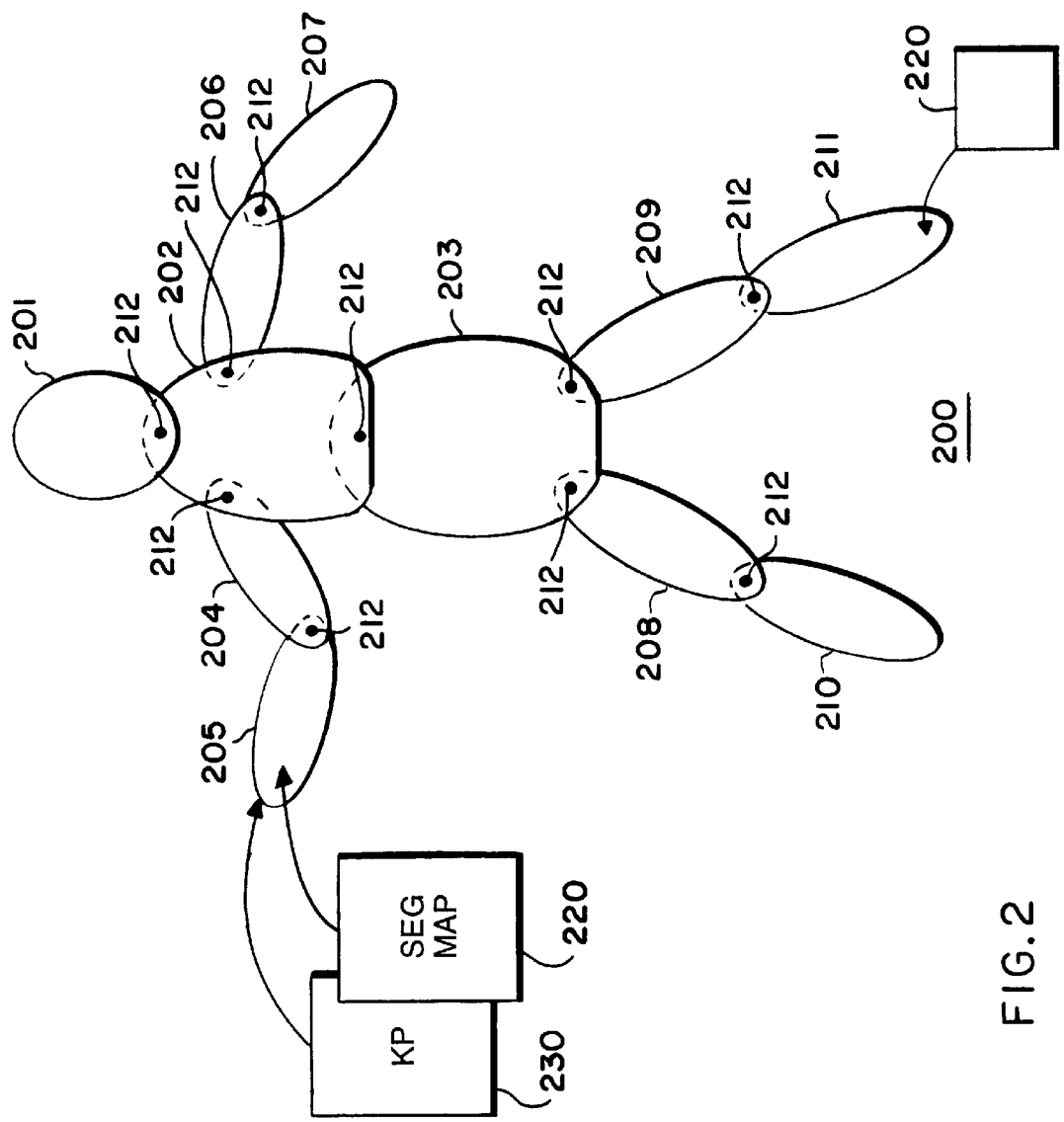
FIG. 2 is a diagram of an articulated model representing a person.

As shown in FIG. 2, the movement of pixels 124 across a sequence of frames 122 is modeled using a collection of links 201–211 whose motion is governed by a kinematic model. Each link can be associated with a group of pixels called a template that represent a specific part of the human body, for example the head, the upper and lower torso, and the limbs.

Although the links shown in FIG. 2 are for a complete body, similar links, having a higher level of detail, can be constructed for specific body parts. For example, if the task is to detect the motion of a hand observed in a close-up video, then the parts can be the wrist, the palm, and the joints of the digits. Here, the links can be used to identify various hand positions such as are commonly used in a sign language to enable automated sign-to-speech conversion.

Associated with each of the link 201–211 is a segmentation map (SEG MAP) 220 that identifies groups of pixels (template) in a frame of a particular volume with an assigned link. The segmentation map 220 can give the locations of the corresponding pixels of the template. Usually the first frame of a volume is taken as the reference frame. The kinematic model defines a parameterized transformation of each link that carries its group of pixels across the image sequence.

In addition, a set of kinematic parameters (KP) 230 is associated with each link. The kinematic parameters describe the motion of a particular link as, for example, the degree of rotation or displacement of the link with respect to the link to which it is connected. Fitting a model to an input sequence of video frames requires the estimation of the segmentation and kinematic parameters 220 and 230. The degrees of freedom that are possible at the various skeletal joints 212 connecting the links of the articulated figure 200 are fixed parameters of the model 200, as are the relative lengths of the links. The relative length of the links can be obtained from anthropomorphic data.

Figure 3:
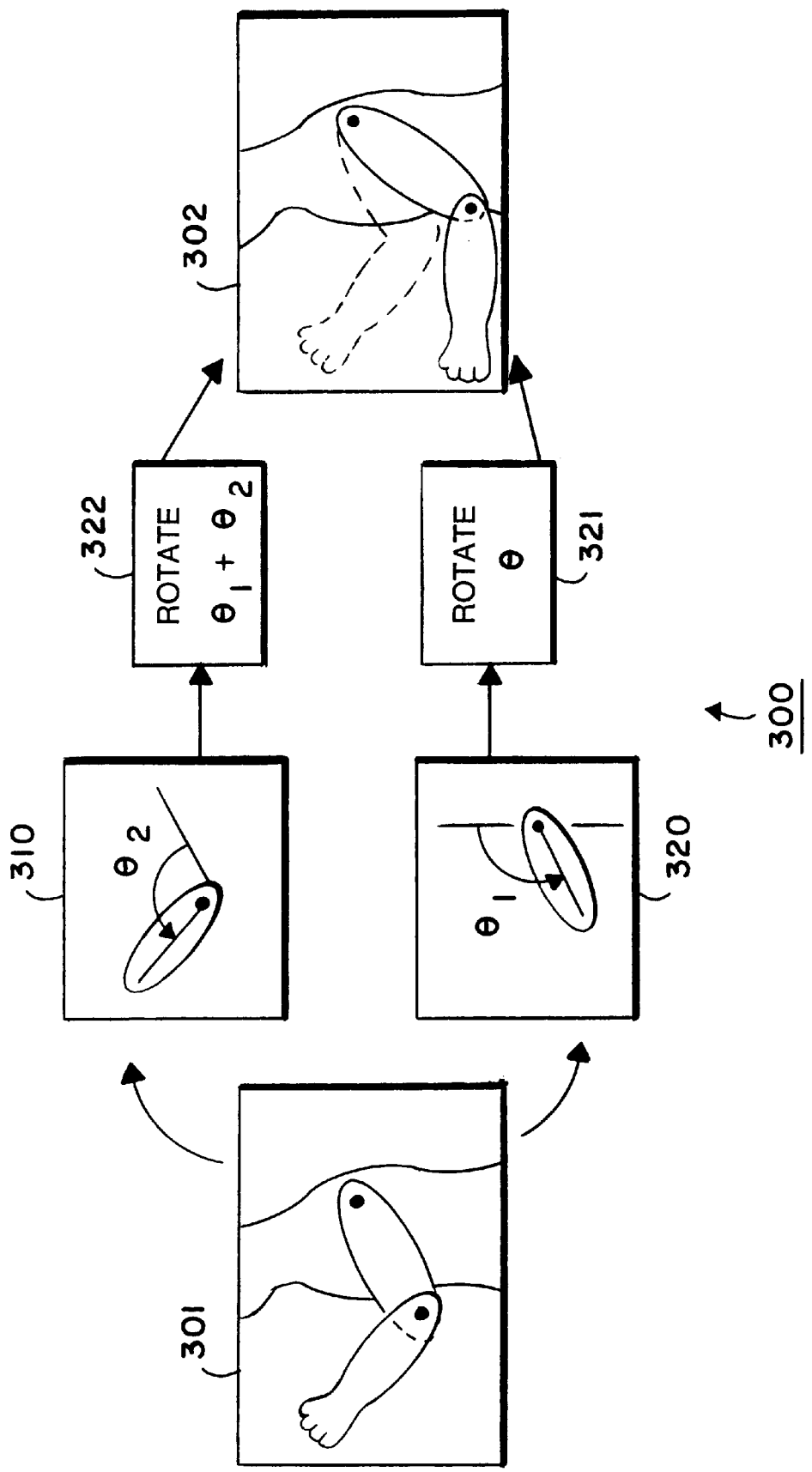
FIG. 3 is a diagram of an articulated model of an arm including two connected links.

FIG. 3 shows an exemplary two-link motion model 300 which can be applied to an earlier frame 301 and a later frame 302. For example, there are two links 310 and 320 corresponding respectively to the upper and lower arm. The angles of the links determine the amount of rotation at the shoulder ($\theta_1$) and the elbow ($\theta_2$). The position of the arm at a given instant in time can be expressed as the amount of rotation $\theta_1$ 321 of the upper arm relative to the shoulder, and the amount of rotation of the lower arm relative to the upper arm, e.g., ($\theta_1+\theta_2$) 322.

In this example, the axises of rotation are perpendicular to the image plane, producing in-plane rotations and translations of the links. Using this model, the later frame 302 can be generated from the earlier frame 301. By varying the body part angles $\theta_1$ and $\theta_2$, any number of subsequent video frames can be modeled. It should be understood, that other limbs and body parts can similarly be modeled.

Because the pixel motion is constrained by the kinematic model, a reasonable good fit is expected for groups of pixels of a video sequence including human motion. As a result, the model variables can provide the basis for a feature space that discriminates human motion from non-human motion.

There are many possible ways to construct feature vectors that can be classified from the kinematic parameters 220 and segmentation maps 230. A representative example vector is a composite vector including the kinematic parameters, ordered by their position in the kinematic chain, followed by samples from the locally-averaged segmentation maps.

In the preferred embodiment, the process by which the motion parameters and segmentation maps are obtained from one of the video volumes 131 is based on a known statistical technique known as Expectation-Maximization (EM). EM provides a means for concurrently segmenting pixel measurements into a set of models while estimating the model parameters. The EM process operates by alternating between an expectation and maximization steps.

The EM process makes it possible to overcome the interdependencies between segmentation and motion estimation. The EM process is based on a general statistical framework for estimating model parameters from incomplete, or missing data. In the case of the present invention, the missing data are the segmentations which assign each image (pixel) measurement to the motion model. Given this segmentation data, the motion model parameters can be estimated using least squared techniques.

Figure 4:
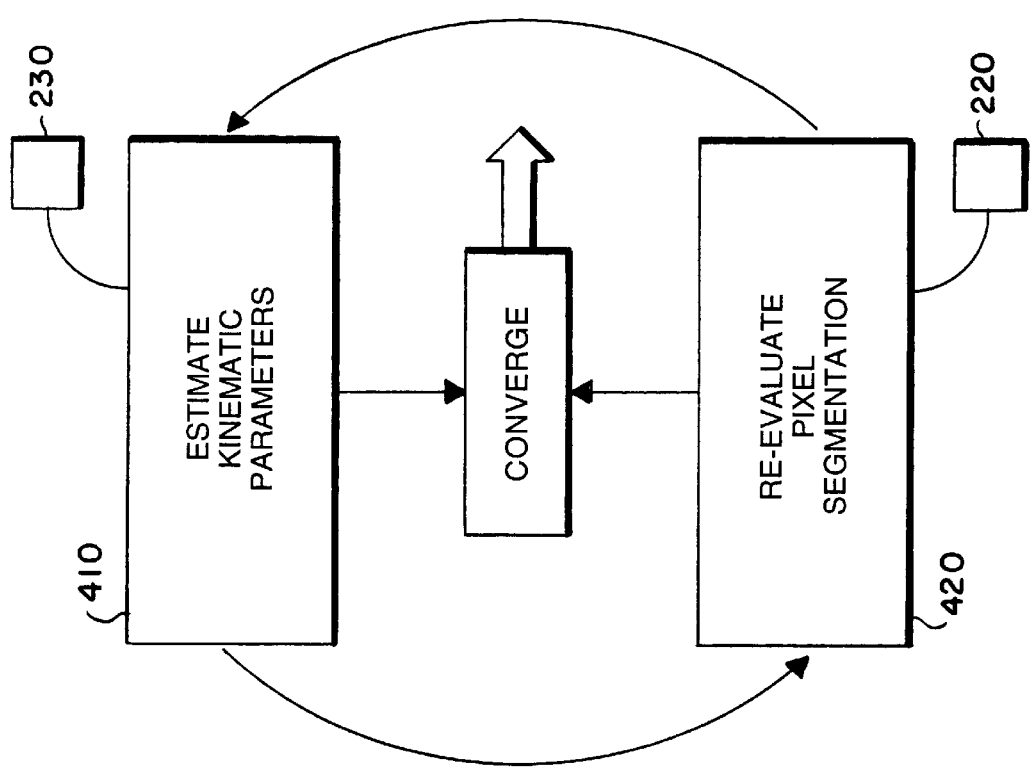
FIG. 4 is a flow diagram of an expectation maximization processes to be used with the models of FIGS. 2 and 3.

As shown in FIG. 4, the EM process 400 alternates between estimating 410 kinematic parameters 230, and re-evaluating the segmentation maps 220. The kinematic parameters for a pair of frames are estimated under the assumption that the assignments of groups of pixels to links are initially known or guessed. This would correspond to determining $\theta_1$ and $\theta_2$ in FIG. 3 with known segmentation maps.

The EM process depends, in part, on a measurement of the residual error associated with a particular set of body part angles. A representative choice is the squared intensity difference between corresponding groups of pixels (templates) in the two images under the action of the kinematic transforms.

In step 420 of the model-fitting process, the estimated motion derived in step 410 is used to re-evaluate the pixel segmentation. For each pixel in the reference image, a set of residual errors can be computed from the set of possible assignments to links in the model. Each possible assignment produces a different type of pixel motion and a corresponding residual error. The set of errors for each link over the entire reference image can be interpreted as a segmentation map. In the context of FIG. 3, this is the process of estimating the segmentation maps given the angle of the body parts.

The complete procedure alternates between the kinematic parameter estimation step 410 and the segmentation map estimation step 420 in an iterative fashion, starting from some initial conditions. Convergence results from the EM process guarantee that iteration of alternating E- and M-steps will cause the overall likelihood of the measured data, given the parameters, to increase. As a gradient ascent process, EM is subject to the usual pitfall such as convergence to local instead of a global maxima. However in practice, the EM process exhibits good performance for segmentation problems.

Detailed Description of Iterative Model-Fitting

The model-fitting process in now described in greater detail, beginning first with a mathematical description of a three dimensional motion model for the entire human body.

In FIG. 3, the kinematic configuration of the arm resulted in purely two dimensional motion. In a more general setting, the pixel motion is the result of the three dimensional motion of a kinematic model relative to the camera. This effect is captured by expressing the motion model as a deformation function, F(P, x, y) which maps pixel coordinates x and y of a reference image to a second image as a function of the motion parameter vector P.

In the example of FIG. 3, P=[$\theta_1$ $\theta_2$]. In general, the motion parameter vector P would contain all of the degrees of freedom of the kinematic model of the human body, including possible joint angles for the head, arms, and legs, and a spatial transform for the body. The spatial transform indicates the relative position of the body with respect to the scene 1 of FIG. 1.

As shown in FIG. 2 for the preferred embodiment of the invention, the human body 200 is modeled as a branched kinematic chain. The kinematic chain is composed of links connected by joints. The three dimensional position of each link is described by a set of coordinate transformations which position the coordinate space of the link (body part) relative to the base coordinate space. The base coordinate space is located in, for example, the torso. The transform parameters can be described, for example, using the Denavit-Hartenberg notation commonly used in robotics.

The three dimensional space of the base of the kinematic chain, e.g., the torso, is described by a rotation and translation which has seven parameters. Each link (limb part) is attached either to the base, or to another link. Then, the three dimensional position of a particular link can be obtained by composing the transforms along the kinematic chain from the particular link to the base.

The appearance of a link over a small number of frames is modeled by a texture-mapped "link plane" attached to the coordinate space of the link. The link plane defines a set of intrinsic coordinates embedded in the local coordinate system of the link. The plane rotates about the axis of symmetry of the link, and the plane is oriented towards the camera.

Given a particular pixel in the link plane for a link m with intrinsic coordinates (u, v), the location of the link in the image is given by a position function. This function has two components: the kinematic model which positions the link plane in three dimensions, and the camera model which projects the link plane into the image. The position function for link m can be expressed as:

$$f_m(q, u, v) = C \cdot T_{base} \cdot T_1 \ldots T_{m-1} \cdot T_m \cdot T_p (u \ v \ 1) \qquad [\text{Eq. 1}]$$

Each $T_i$ specifies the relative three dimensional transform between link i and link i−1, where link 0 is the base of the chain. The additional transform $T_p$ models any additional offset between the coordinate space for link m and the coordinate system of the link plane. In Equation 1, C is an orthographic camera model which projects the three dimensional location of a pixel in the link plane to the plane of the image. Thus, any detected pixel motion across a pair of frames is due to the motion of the set of link planes under the action of the kinematic model.

The pixel motion between two frames resulting from a change in joint angles is modeled with a kinematic deformation function. The kinematic deformation function is constructed from the position function of Equation 1 by composing transforms to and from the intrinsic (link plane) coordinates:

$$F_m(P, x, y) = f_m(q_i, f^{-1}_m(q_j, x, y)) \qquad [\text{Eq. 2}]$$

gives the displacement between frames i and j in a sequence, where $q_i$, and $q_j$ give the position of the model in each frame, and together comprise the motion vector P.

In this example, a pixel coordinate (x, y) in a frame j is first mapped back to the intrinsic coordinates of the link plane, and then mapped forward into the coordinates for frame i. The kinematic deformation function expressed in Equation 2 has been used in systems used for tracking articulated objects when templates are given in advance. Here, where the EM process is employed to solve for the segmentation, the same model is used, even though the templates are not available.

Note, as an advantage, that the articulated model as described here says nothing about the shapes of the links. As each link in the articulated model moves, the associated link plane moves with the link. Thus, for any point in the plane of the image, each link can describe a motion anywhere in the image. Segmentation amounts to cutting the image planes into the right shapes to match actual image motion. In other words, the exact shape of the links is not determined by the model, but by the movement of the templates or groups of pixels which are assigned to links.

As shown in FIG. 2, segmentation is represented by a set of segmentation maps 220, one for each link in the model, taken with respect to the reference frame. The segmentation map 220 for a link is an array of likelihoods. The array specifies the probability that each pixel in the reference image originated from that link in the model. In the case where the segmentation is known, these likelihoods would be one's and zero's.

In the present implementation, the likelihoods are continuous unknown parameters, which can be written as $g_m(x, y)$, where m is an index in the link model, and x and y specify the location of a pixel in the reference image.

Given an estimated, or known segmentation, it is possible to estimate the corresponding motion parameters by minimizing a residual error measurement. Many residual choices are possible. A representative example residual measurement, for two frame motion estimation, determines an intensity difference between corresponding pixels. This can be written as:

$$R_m(P, x, y)^2 = I_2(F(P, x, y)) - I_1(x, y)]^2 \qquad [\text{Eq. 3}]$$

where m is the link number, and the deformation function acts on consecutive frames in the sequence. When the motion is correct, corresponding motion of pixels in the two images will be similar and the residual error will be low. Using these foundations, the two steps of the motion estimation process can be described in more detail.

Expectation Step

In this step, the segmentation maps 220 are updated using the current estimate of the motion parameters and the image measurements. This step computes the conditional likelihood of each pixel originating from each motion model, as measured by the residual error associated with that assignment. This can be written as:

$$g_m(x, y) = \frac{p_m e^{-R_m^2(P,x,y)/\sigma^2}}{\sum_{i=1}^{M} p_i e^{-R_m^2(P,x,y)/\sigma^2}} \qquad [\text{Eq. 4}]$$

where, $p_m$ represents the prior probability of assigning a measurement to model m, and the variance $\sigma^2$ controls the "softness" of the partition. Thus, mixture probability $g_m(x, y)$ describes the conditional likelihood of assigning a measured pixel at location x, y to the link m.

Maximization Step

During this step, the motion parameters 230 are estimated given the soft assignment of groups of pixels to motion models provided by a current segmentation map. The maximum-likelihood estimator for each flow model selects the parameters that minimize the residual error weighted by the segmentation. This can be written as:

$$P = argmin[P] \sum_M \sum_{(x,y)} g_m(x, y) R_m^2(P, x, y) \qquad [\text{Eq. 5}]$$

where P is the vector of parameters for model m. Note that in this minimization $R_m(P, x, y)$ is treated as a function of P, while the conditional likelihood $g_m(x,y)$, which implicitly depends on P, is held constant. This optimization can be performed through standard numerical techniques.

The maximization step is initialized by setting the segmentation estimates so that each pixel is given the same probability of belonging to any of the links. The parameters P are all initialized to zero. Then, the maximization step is performed to update the parameter values of P. Following this, the expectation step 410 is applied to update the segmentation maps 220. These two steps are iterated until the motion parameter estimates converge with their assigned segmentation maps.

In the present embodiment, the EM process is exploited to directly estimate body motion to produce powerful classifier features. Because this approach constrains the entire motion of a moving human body with a single kinematic model, the present approach has fewer parameters than a collection of affine models, such as known in the prior art, and is much more tuned to the intrinsic nature of human motion.

The method steps as described above can also be applied to more complicated three dimensional motion. In general, segmentation will be more difficult when the relative motion between frames is small. Using more frames in model-fitting can alleviate this when occlusions are properly handled.

It is important to note that it is not necessary for the model-fitting process to produce highly accurate motion and segmentation estimates in order to discern human body motion. It is sufficient that the model-fitting process is more likely to identify motion as human, as opposed to the motion of non-human objects.

Although the preferred embodiment has been described for detecting human motion, it should be noted that the disclosed method steps can also be used to detect motion of other living things such as animals, plants. In general, the method can be used for any moving object animate, inanimate, real or virtual, which can be modeled as having a collection of connected links which can move, and where the possible motions of the links can be expressed as a set of dependent differential vector functions. This would include objects with parts capable of non-rigid motion.

Having described a preferred embodiment of the invention, it will not become apparent to one skilled in the art that other embodiments incorporating its concepts may be used. It is felt therefore, that this embodiment should not be limited to the disclosed embodiment, but rather should be limited only by the spirit and the scope of the appended claims.

We claim:

1. A computerized method for detecting a moving object in a sequence of frames of a video of a scene, each frame including a plurality of pixels representing light intensity values at specific locations in the scene, comprising the steps of:

representing the object as a branched kinematic chain composed of links connected at joints;

iteratively segmenting frames by assigning groups of pixels to individual links, while estimating motion parameters for the groups of pixels assigned to the individual links until the segmented groups of pixels and the estimated motion parameters converge; and identifying the groups of pixels as representing the moving object modeled by the branched kinematic chain.

2. The method of claim 1 wherein the moving object is a person, and the plurality of links model the limbs and torso of the person.

3. The method of claim 1 wherein each of the joints connecting the links has a predetermined degrees of freedom about which the links can be displaced.

4. The method of claim 1 wherein the links have predetermined relative lengths.

5. The method of claim 1 wherein the motion parameters include the relative angular displacement of groups of pixels assigned to links connected by a common joint.

6. The method of claim 1 wherein a first link is designated as the base of the kinematic chain.

7. The method of claim 6 further comprising:

describing a position of a second link as a coordinate transformation relative to the base.

8. The method of claim 7 further comprising:

describing a position of the base as a rotation and translation with respect to the scene.

9. The method of claim 1 further comprising:

modeling pixel motion between two temporally adjacent frames due to a change of a joint angle by a kinematic deformation function.

10. The method of claim 1 wherein the video is partitioned into a plurality of volumes, each volume includes a predetermined number of frames.

11. The method of claim 1 wherein the representing, segmenting, estimating, and identifying steps are performed separately on each of the plurality of volumes.

12. The method of claim 10 wherein a space-time pyramid is extracted from each volume.

13. The method of claim 12 wherein the space-time pyramid is extracted by downsampling the frames of each volume over time and space.

14. The method of claim 1 wherein the groups of pixels are classified for identification by a feed-forward neural network.

15. The method of claim 1 wherein the branched kinematic chain constrain how the links move relative to each other.

16. The method of claim 3 wherein the links move rigidly depending on the degrees of freedom at the joints.

17. The method of claim 1 further comprising:

associating a segmentation map and kinematic parameters which each link, the segmentation map identifying a particular group of pixels associated with the link, and the kinematic map describing the motion of the particular group of pixels.

18. The method of claim 17 wherein the segmentation map and the kinematic parameters are represented as a feature vector of the associated link.

19. The method of claim 17 wherein the segmentation map includes an array of likelihoods that the group of pixels is associated with the link.

20. The method of claim 17 wherein the segmentation map and the kinematic parameters of a particular link are iteratively estimated in alternating steps until the segmentation map and the kinematic parameters converge.

21. The method of claim 17 further comprising:

estimating the motion parameters using a deformation function $F(P, x, )$, where P are the kinematic parameters of a particular pixel at a location x and y.

22. The method of claim 1 wherein a shape of a particular link is determined from the motion of the associated group of pixels.

23. A computerized method for detecting a moving object in a sequence of frames of a video of a scene, each frame including a plurality of pixels representing light intensity values at specific locations in the scene, comprising the steps of:

modeling the object by a set of links and a set of dependent differential vector functions which constraint the motion of the links;

iteratively segmenting frames by assigning groups of pixels to individual links, while estimating motion parameters for the groups of pixels assigned to the individual links until the segmented groups of pixels and the estimated motion parameters converge; and identifying the groups of pixels as representing the moving object as modeled by the set of links and vector functions.

24. The method of claim 23 wherein the set of links and the dependent differential vector functions are organized as a branched kinematic chain.

* * * * *